P. S. STEENSTRUP & C. S. LOCKWOOD.
ROLLER BEARING YOKE DRIVEN BY SHAFT.
APPLICATION FILED AUG. 18, 1908.
926,967.
Patented July 6, 1909.
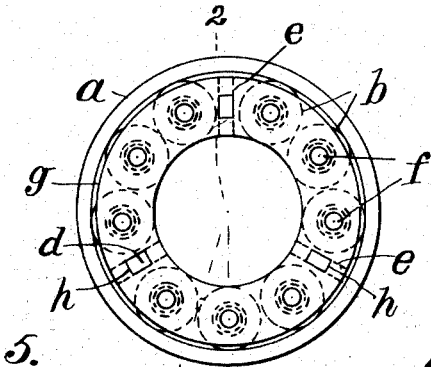
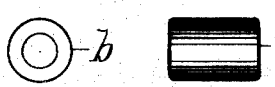
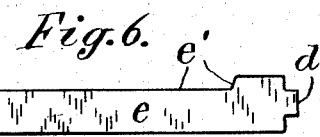
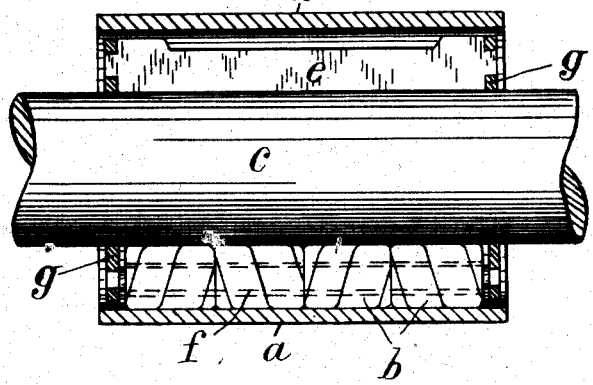
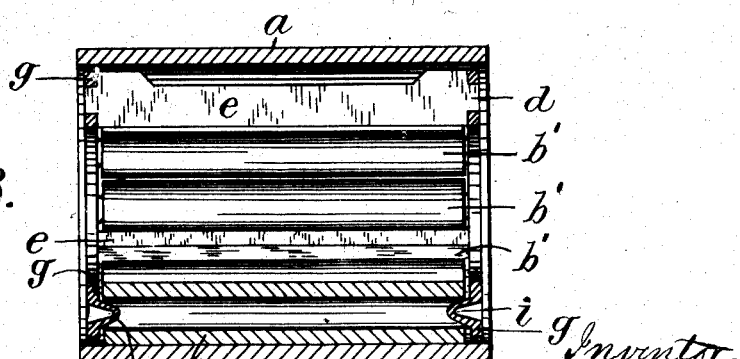

UNITED STATES PATENT OFFICE.

PETER S. STEENSTRUP AND CHARLES S. LOCKWOOD, OF NEWARK, NEW JERSEY.

ROLLER-BEARING YOKE DRIVEN BY SHAFT.

No. 926,967.      Specification of Letters Patent.     Patented July 6, 1909.

Application filed August 18, 1908. Serial No. 449,068.

*To all whom it may concern:*

Be it known that we, PETER S. STEENSTRUP and CHARLES S. LOCKWOOD, citizens of the United States, residing at Newark, Essex county, New Jersey, have invented certain new and useful Improvements in Roller-Bearing Yokes Driven by Shafts, fully described and represented in the following specification and the accompanying drawings, forming a part of the same.

This invention relates to that class of roller bearings in which a so-called cage is used to hold the rolls approximately parallel with one another in their movement around the shaft, such cage consisting of rings at opposite ends of the bearing with guide bars extended between the rings to guide the rolls. In such cages the rings have been made with their inner and outer edges to clear the shaft and shell or casing of the bearing, or to clear the shaft and fit the casing, whereby the frictional contact with the casing operated to retard the rotation of the cage and rolls, and cause a slipping of the rolls upon the shaft. Such slipping also causes friction with the shaft, and reduces the efficiency of the rolls. Such cages have often been used with loose rolls made long enough to fit between the rings of the cage, and in such case the rings have been tied together by several flat tie-bars inserted radially between groups of the rolls and operating to hold the rolls parallel with the shaft. The rings and guide-bars of such cages have commonly been fitted to touch the casing of the bearing, and thus exert a frictional drag upon the rolls, which is greatly aggravated if any dirt or other foreign matter gains access to the bearing, as such dirt is thrown outward to the casing by the centrifugal motion, and increases the frictional resistance.

The object of the present invention is to avoid such frictional resistances to the movement of the rolls, and to actually make the friction efficient in propelling the cage around within the casing, and this object is accomplished by making a cage with rings fitted to contact with the shaft, so that where the shaft revolves inside a stationary bearing, its motion may be in a slight degree imparted to the cage and thus impel the rolls in the direction in which they are traveling.

The invention also includes the use of flat guide-bars connecting the rings, and made to contact with the revolving shaft, and narrow enough to wholly clear the casing so as to avoid any frictional contact therewith.

The invention will be understood by reference to the annexed drawing, in which—

Figure 1 is an end view of a bearing having these improvements; Fig. 2 is a section of the same, on line 2—3 in Fig. 1; with a shaft in the bearing; Fig. 3 is a similar section without the shaft on line 2—4 in Fig. 1; and showing continuous rolls, while Fig. 2 shows the roll in sections. Fig. 4 is an end view of a roll; Fig. 5 is a side view of a roll-section; and Fig. 6 is a side view of a flat guide-bar.

*a* designates a shell within which the rolls are shown, and which may be inserted in any suitable roll-bearing; *b* designates the roll-sections, shown of solid tubes in Fig. 4, and of a spirally wound strip in Fig. 2. In Fig. 2 a shaft *c* is shown within the rolls, and the rings *g* are shown fitted to contact with the shaft. Cylindrical guide-bars *f* are extended through the roll-sections in Fig. 2, and their ends fitted into the rings. The rings are shown tied together by flat guide-bars *e*, also fitted into contact with the shaft, and cut away on their outer sides to form recesses at *e'* so as to wholly clear the shell *a*.

In this invention it is not necessary to bore out the roll-sections or fit them closely to their guide-rods *f*, as the groups of rolls between the flat guide-bars *g* are held parallel by these flat bars, and the bars *f* are therefore fitted very loosely to the roll sections.

The cylindrical guide-bars are not necessary if rolls in one piece are used, like those shown in Fig. 3, this figure showing tubular rolls extended from one ring to the other, and held approximately in place by conical studs *i* on the rings as is common. Fig. 3 shows two of the flat guide-bars *e*, which are arranged in practice to stand close to the adjacent rolls, so as to touch the nearest roll if it gets out of parallelism, and thus guides such roll and the others of the same group, which revolve close thereto; these guide-bars serving as the means of connection between the rings, by means of tenons *d* on the bars fitted to mortises *h* in the rings.

All the rolls in Fig. 3 are shown each of one piece of tube, as is common; the only novelty in this construction being the fitting of the ring and guide-bar into contact with the shaft, so as to be propelled thereby, from the friction between their contacting surfaces; and the clearance between the bar and the shell, which is effected by making it narrow enough at the ends, and also by notching its outer side between the ends, so as to freely clear or pass over any dirt that may adhere to the shell. The outer side of the rings $g$ is made to clear the shell, but the ring is made wider than the middle or recessed portion of the bars $e$ to secure strength enough for the mortises $h$.

From the above description it will be seen that the invention requires an intentional contact of the rings $g$ with the shaft, and that the advantages of such contact are also obtained by making the inner edges of the guide-bars to contact in like manner, and that the invention is especially applicable to bearings in which the casing is stationary, and the shaft revolves therein.

The shell $b$ represents any lining which may be used in the casing of a roller-bearing, but the invention may be applied to a casing having no lining when desired.

We are aware that rolls have been journaled in cages so as to make the entire set of rolls capable of handling as a unit independent of the casing, and that cages or guides have been used consisting of rings with tie-bars which did not confine the rolls within the cage when removed from the casing; but we are not aware that any such cage has been constructed with the end rings fitted to contact intentionally with the shaft so as to maintain a frictional engagement with the shaft during the operation of the bearing.

What is claimed herein is:—

1. A roller bearing having a shell or casing, a shaft rotated within the shell, a cage consisting of rings fitted to contact with the shaft and frictionally propelled thereby, guide-bars connecting the rings, and groups of rolls arranged between the guide-bars to support the axle within the shell.

2. A roller bearing having a shell or casing, a shaft rotated within the shell, a cage consisting of the rings $g$ to contact with the shaft and frictionally propelled thereby, guide-bars $e$ connecting the rings and having the recesses $e'$ cut away upon the upper sides to wholly clear the shell, and groups of rolls arranged between the guide-bars to support the axle within the shell.

In testimony whereof we have hereunto set our hands in the presence of two subscribing witnesses.

PETER S. STEENSTRUP.
CHARLES S. LOCKWOOD.

Witnesses:
ALFRED COATES,
CLIFFORD PARSHALL.